United States Patent
Ju et al.

(10) Patent No.: US 12,413,833 B2
(45) Date of Patent: Sep. 9, 2025

(54) VEHICLE CAMERA

(71) Applicant: Getac Technology Corporation, New Taipei (TW)

(72) Inventors: Shuan-Yeong Ju, Taipei (TW); Ruei-Rong Lin, Taipei (TW); Wei-Chung Hsiao, Taipei (TW)

(73) Assignee: Getac Technology Corporation, New Taipei (TW)

( * ) Notice: Subject to any disclaimer, the term of this patent is extended or adjusted under 35 U.S.C. 154(b) by 223 days.

(21) Appl. No.: 18/217,659

(22) Filed: Jul. 3, 2023

(65) Prior Publication Data

US 2025/0016432 A1 Jan. 9, 2025

(51) Int. Cl.
*H04N 23/52* (2023.01)

(52) U.S. Cl.
CPC .................................. *H04N 23/52* (2023.01)

(58) Field of Classification Search
CPC ........ H04N 23/52; H04N 23/51; H04N 23/57; B60R 11/04; G03B 17/55; G03B 17/561
See application file for complete search history.

(56) References Cited

U.S. PATENT DOCUMENTS

| | | | | |
|---|---|---|---|---|
| 5,563,659 | A * | 10/1996 | Bernhardt | G08B 13/19623 396/428 |
| 8,525,924 | B2 * | 9/2013 | Jannard | G03B 19/00 348/374 |
| 10,701,249 | B1 * | 6/2020 | Guo | H05K 7/20318 |
| 2014/0104479 | A1 | 4/2014 | Samuels et al. | |
| 2016/0174408 | A1 | 6/2016 | Tolbert et al. | |
| 2016/0301819 | A1 | 10/2016 | Petty et al. | |
| 2017/0057422 | A1 * | 3/2017 | Takehara | B60R 11/04 |
| 2017/0064165 | A1 * | 3/2017 | Onishi | H04N 23/51 |
| 2017/0171371 | A1 * | 6/2017 | Jannard | H04N 23/45 |
| 2024/0402579 | A1 * | 12/2024 | Nilsson | F16C 11/103 |

FOREIGN PATENT DOCUMENTS

| | | |
|---|---|---|
| CN | 111193847 A | 5/2020 |
| CN | 216086772 U | 3/2022 |
| CN | 114745482 A | 7/2022 |
| DE | 19637279 A1 | 3/1998 |
| EP | 1473193 B1 | 9/2006 |
| JP | 2021152609 A | 9/2021 |
| WO | 2020144470 A1 | 7/2020 |

OTHER PUBLICATIONS

Camvate Simple Wooden Hand Grip, Aug. 9, 2022, retrieved from https://web.archive.org/web/20220809204158/https://camvate.com/products/camvate-simple-wooden-hand-grip-right-side-with-1-4quot-20-mounting-groove-for-dslr-camera-cage-kit-2959 on Mar. 19, 2025 (Year: 2022).*
Euporean Patent Office, Extended European Search Report—EU23199737.0, Mar. 11, 2024, Germany.
Examination Report issued by the IPO (Australia) on Aug. 31, 2024.

* cited by examiner

*Primary Examiner* — Timothy J Henn
(74) *Attorney, Agent, or Firm* — Troutman Pepper Locke LLP; Tim Tingkang Xia, Esq.

(57) ABSTRACT

The vehicle camera includes a camera main body and two thermal insulation components. The camera main body has two side surfaces facing away from each other. The two thermal insulation components are respectively disposed on the side surfaces of the camera main body facing away from each other. Thermal conductivities of the two thermal insulation components are smaller than a thermal conductivity of the camera main body.

14 Claims, 7 Drawing Sheets

VEHICLE CAMERA

TECHNICAL FIELD

The disclosure relates to a vehicle camera, more particularly to a vehicle camera having thermal insulation components.

BACKGROUND

In general, a dashcam is provided in a vehicle (e.g., a car) to record views in front of the vehicle. When a driver drives the vehicle, the driver may use one hand to rotate the dashcam to adjust the camera angle thereof.

However, a casing of the dashcam is made of metal material for facilitating heat dissipation, but it may cause the casing of the dashcam to have high temperature during operation. Thus, when the drive uses one hand to touch and rotate the dashcam, the driver may feel uncomfortable. Accordingly, how to solve the aforementioned issue is one of the topics in this field.

SUMMARY

The disclosure provides a vehicle camera which is capable of preventing the driver from feeling uncomfortable when rotating the vehicle camera.

One embodiment of the disclosure provides a vehicle camera. The vehicle camera includes a camera main body and two thermal insulation components. The camera main body has two side surfaces facing away from each other. The two thermal insulation components are respectively disposed on the side surfaces of the camera main body facing away from each other. Thermal conductivities of the two thermal insulation components are smaller than a thermal conductivity of the camera main body.

According to vehicle camera as discussed in the above embodiment, the thermal insulation components are respectively disposed on the side surfaces of the camera main body facing away from each other, and the thermal conductivities of the thermal insulation components are smaller than the thermal conductivity of the camera main body, such that heat generated by the camera main body is difficult to be conducted to the thermal insulation components, and thus the thermal insulation components have relative lower temperatures. Therefore, when a driver uses one hand to grip the thermal insulation components for rotating the vehicle camera, the relative lower temperatures of the thermal insulation components may not make the driver to feel uncomfortable.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 1:
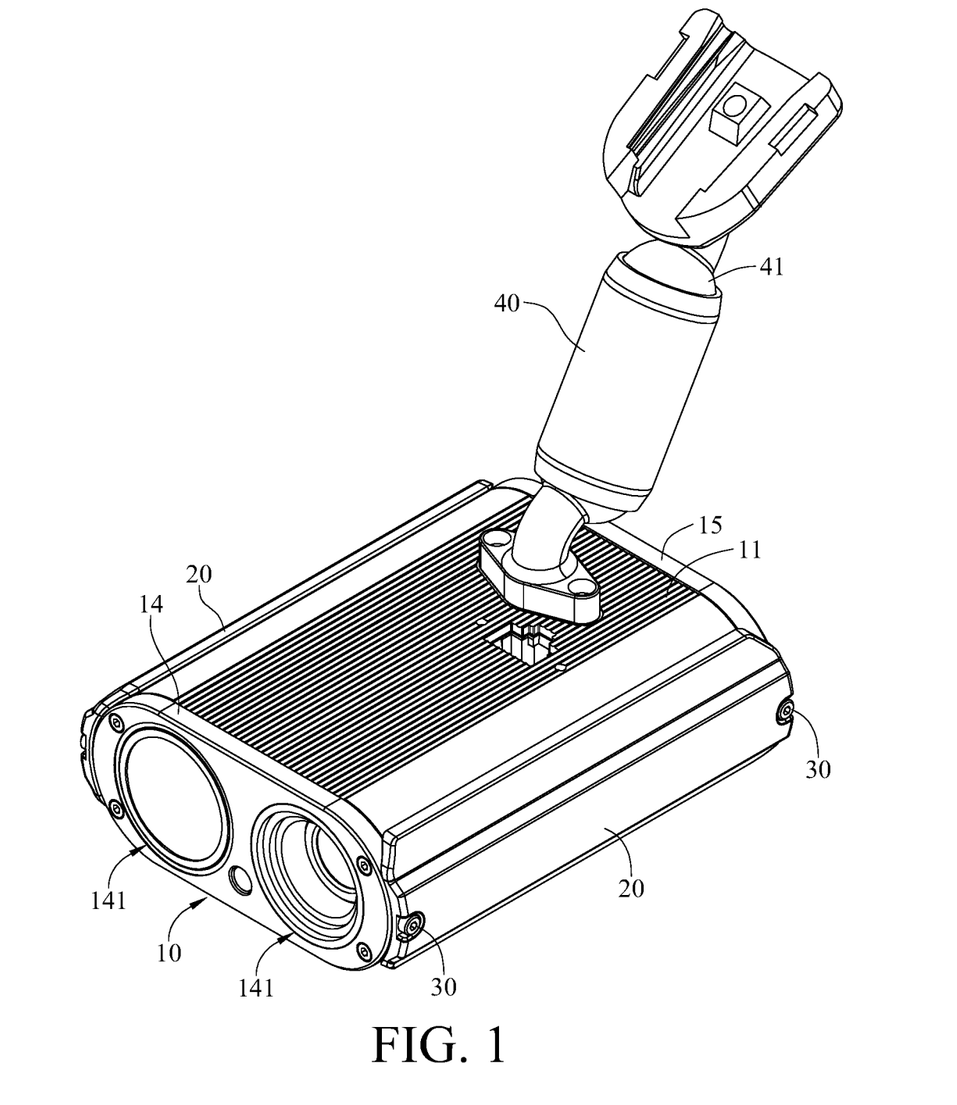
FIG. 1 is a perspective view of a vehicle camera according to one embodiment of the disclosure.
Figure 2:
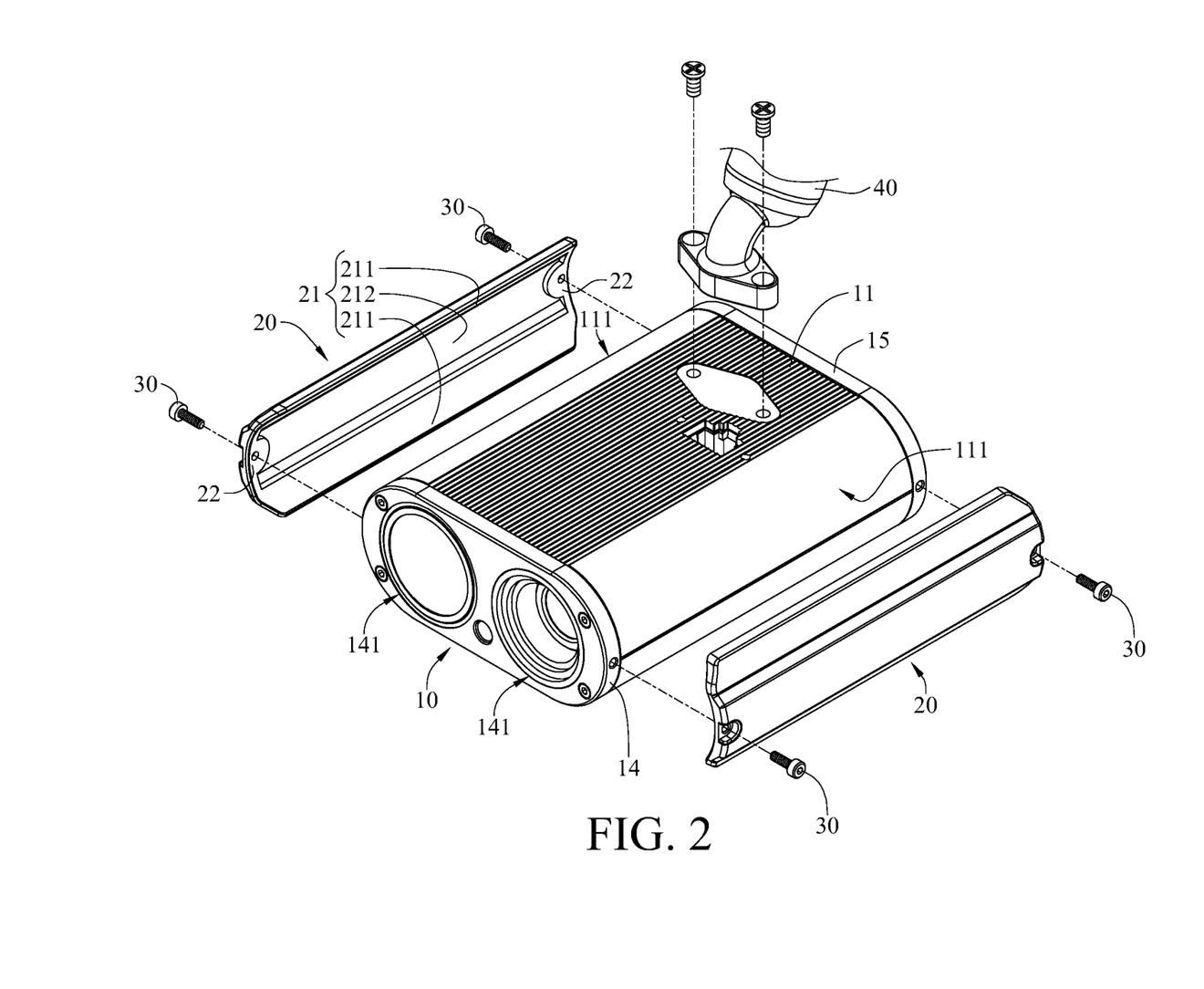
FIG. 2 is an exploded view of the vehicle camera in FIG. 1.

Referring to FIGS. 1 and 2, FIG. 1 is a perspective view of a vehicle camera 1 according to one embodiment of the disclosure, and FIG. 2 is an exploded view of the vehicle camera 1 in FIG. 1.

In this embodiment, the vehicle camera 1 includes a camera main body 10 and two thermal insulation components 20. In addition, the vehicle camera 1 may further include a plurality of fasteners 30 and a support 40.

Figure 3:
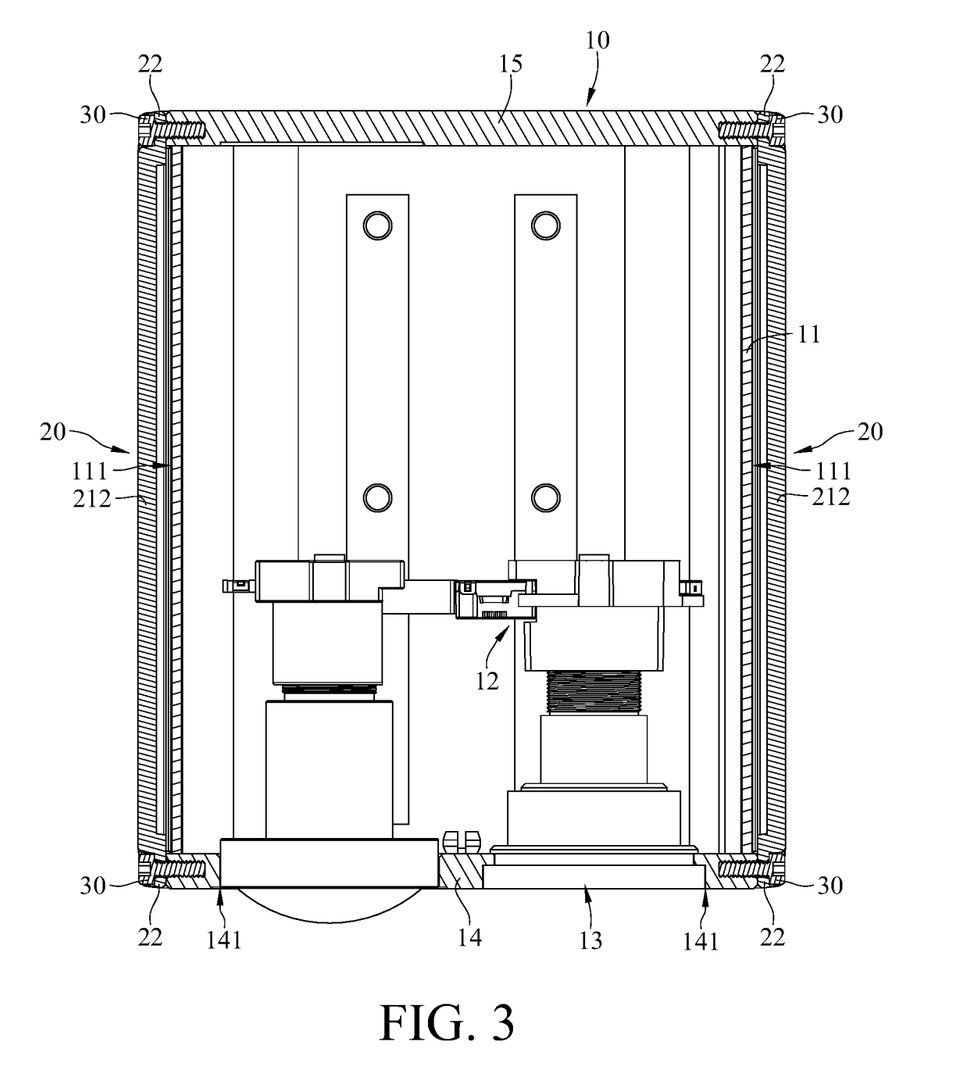
FIG. 3 is a cross-sectional view of the vehicle camera in FIG. 1.
Figure 4:
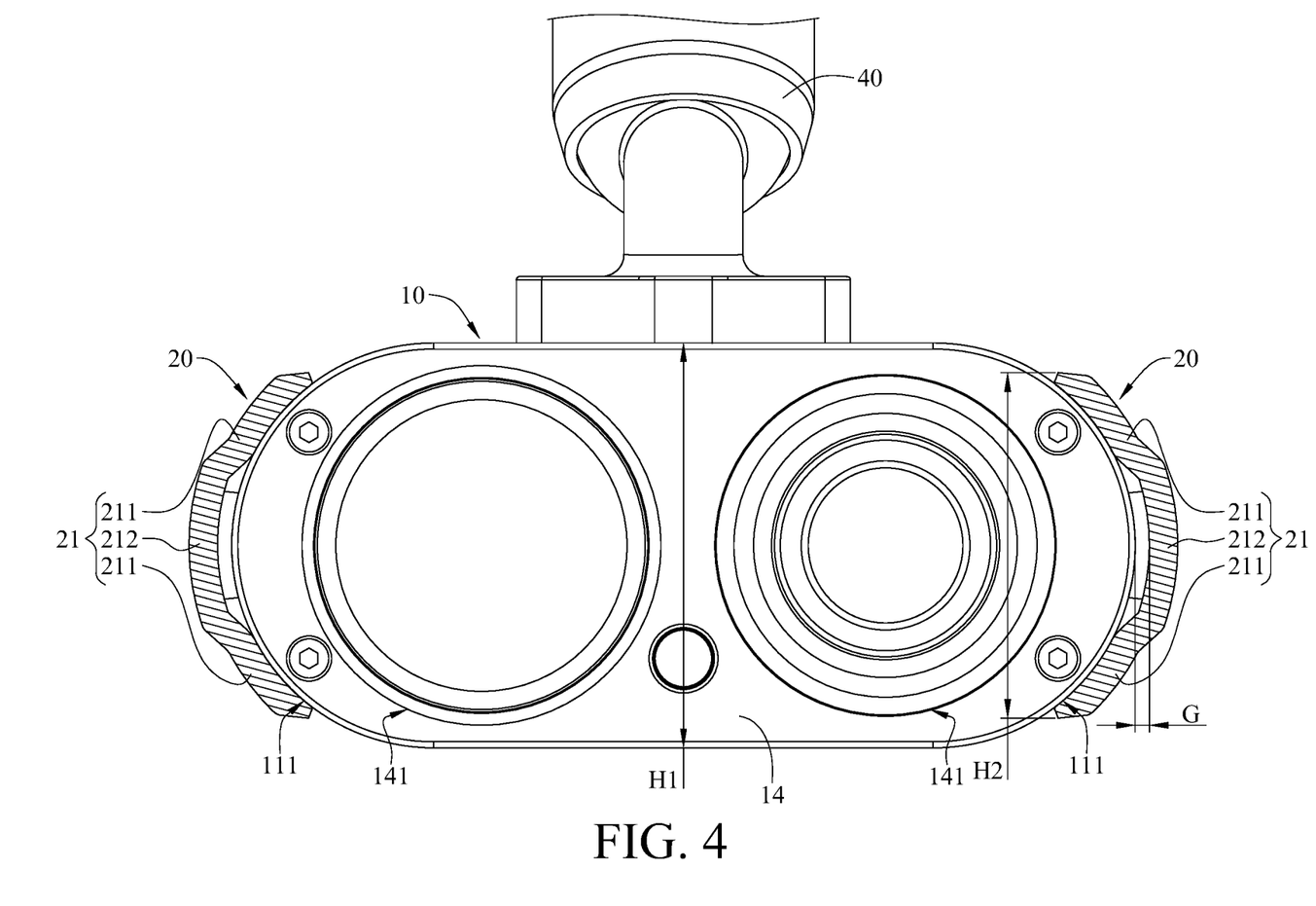
FIG. 4 is another cross-sectional view of the vehicle camera in FIG. 1.

Then, referring to FIGS. 2 to 4, FIG. 3 is a cross-sectional view of the vehicle camera 1 in FIG. 1, and FIG. 4 is another cross-sectional view of the vehicle camera 1 in FIG. 1.

The camera main body 10 may include a casing 11, an electronic assembly 12, a lens assembly 13, a front cap 14, and a rear cap 15. The casing 11 is, for example, made of a metal material, such as aluminum, and a thermal conductivity of the casing 11 is approximately 204 W/m–° C. The casing 11 has a fixed cross-sectional profile by pushing material through a die of the desired cross-section. In other words, the casing 11 is made by extrusion. The cross-section of the casing 11 is shaped like a fully rounded rectangle. The cross-section of the casing 11 has adjacent dimples along the length or straight part of the fully rounded rectangle. The electronic assembly 12 and the lens assembly 13 are accommodated in the casing 11. During the operation of the camera main body 10, the electronic assembly 12 may generate heat, and the heat may be conducted to the casing 11. The front cap 14 and the rear cap 15 are made of metal. A front view of the front cap 14 is shaped like a fully rounded rectangle. The lens assembly 13 is exposed through two circular openings 141 of the front cap 14. The length of the fully rounded rectangle is longer than the combination of the diameters of the two circular openings 141. A rear view of the rear cap 15 shares the same shape as the front view of the front cap 14. Both the front cap 14 and the rear cap 15 are fixed to the cross-section of the casing through four screws.

In this embodiment, the casing 11 has two side surfaces 111 facing away from each other, and the side surfaces 111 are, for example, curved surfaces. A curved part of the fully rounded rectangle extends along an extrusion direction of the casing 11 to form the curved surfaces or the side surfaces 111. The two thermal insulation components 20 are, for example, curved plates. The thermal insulation components 20 are, for example, made of plastic material, such as polycarbonate, and thermal conductivities of the thermal insulation components 20 are smaller than or equal to 10 W/m-° C. The two thermal insulation components 20 are respectively fixed on the front cap 14 and the rear cap 15 via the fasteners 30. The thickness of the front cap 14 and the thickness of the rear cap 15 are thicker than the diameter of a fastener or a screw head thereof. As disclosed below, the two thermal insulation components 20 are fully or partially molded to or in contact with the two side surfaces 111 of the casing 11. In this embodiment, the thermal insulation components 20 are the same in structure, and the thermal insulation components 20 are respectively fixed on the front cap 14 and the rear cap 15 via the same means, and thus the following paragraphs merely introduce one thermal insulation component 20 and how this thermal insulation component 20 is fixed to the front cap 14 and the rear cap 15.

The thermal insulation component 20 may include a middle portion 21 and two mount portions 22 respectively connected to two opposite sides of the middle portion 21. The middle portion 21 may include two contact parts 211 and a connection part 212 located between and connected to the two contact parts 211. The contact parts 211 of the middle portion 21 and the mount portions 22 are in contact with the side surface 111 of the casing 11, and the connection part 212 of the middle portion 21 is spaced apart from the side surface 111 of the casing 11 by a distance G, where the distance G falls within a range from 1.08 mm to 1.32 mm. In this embodiment, the height H2 of the thermal insulation component 20 is smaller than the height H1 of the camera main body 10, and the height H2 may be 90% of the height H1, but in some other embodiments, the height of the thermal insulation component may be 110% of the height of the camera main body; that is, the height of the thermal insulation component may fall within a range from 90% to 110% of the height of the camera main body, but the disclosure is not limited thereto, the relative height relationship between the thermal insulation component and the camera main body may be modified as actual requirements.

The fasteners 30 are, for example, screws. The fasteners 30 are respectively disposed through the two mount portions 22 of the thermal insulation component 20 and screwed into the front cap 14 and the rear cap 15 of the camera main body 10.

Note that the thermal insulation component 20 is not restricted to being fixed on rear cap 15 via the fasteners 30; in some other embodiment, the thermal insulation component may be fixed on the side surface of the casing via, for example, an adhesive or a snap-fit manner.

One end of the support 40 is assembled with the camera main body 10, and another end of the support 40 may be fixed to a roof or windshield of a vehicle (not shown). The support 40 may have a universal joint structure 41 (shown in FIG. 1) to enable the camera main body 10 to be rotated for adjusting the camera angle of the camera main body 10.

In this embodiment, the thermal insulation components 20 are respectively disposed on the side surfaces 111 of the camera main body 10 facing away from each other, and the thermal conductivities of the thermal insulation components 20 are smaller than the thermal conductivity of the camera main body 10, such that heat generated by the camera main body 10 is difficult to be conducted to the thermal insulation components 20, and thus the thermal insulation components 20 have relative lower temperatures. In other words, it is hard for the camera main body 10 to pass its heat through the thermal insulation components 20 and conduct its heat to a driver or user. Therefore, when a driver uses one hand to grip the thermal insulation components 20 for rotating the camera main body 10, the relative lower temperatures of the thermal insulation components 20 may not make the driver to feel uncomfortable.

Specifically, during the operation of the vehicle camera 1, the surface temperature of the camera main body 10 may be approximately above 60° C. However, a regulation restricts a surface of an object for being touched in a short period (e.g., >1s and <10s) to be 60° C. in maximum. In this embodiment, there are two thermal insulation components 20 provided at the side surfaces 111 of the camera main body 10 facing away from each other, and the temperatures of the thermal insulation components 20 are measured to be approximately 49.5° C. As a result, even though the surface temperature of the camera main body 10 is high, the driver is to grip the thermal insulation components 20 of relative lower temperature instead of the camera main body 10, and thus the driver can comfortably rotate the camera main body 10 for adjusting the camera angle thereof.

In this embodiment, the vehicle camera 1 is applied in the vehicle, and there is a resistance provided at the universal joint structure 41 of the support 40 in order to prevent the camera main body 10 from being rotated due to vibrations caused by an uneven road condition. Also, two opposite sides of the camera main body 10 where the thermal insulation components 20 are disposed are the places where the hand of the driver can easily apply forces to rotate the camera main body 10. Therefore, when the driver desires to rotate the camera main body 10, the thermal insulation components 20 disposed at the two opposite sides of the camera main body 10 ensure the driver to comfortably rotate the camera main body 10 for adjusting the camera angle thereof.

Note that the aforementioned materials of the casing 11, the front cap 14, the rear cap 15, and the thermal insulation components 20 are merely exemplary and may be modified according to actual requirements.

Figure 5:
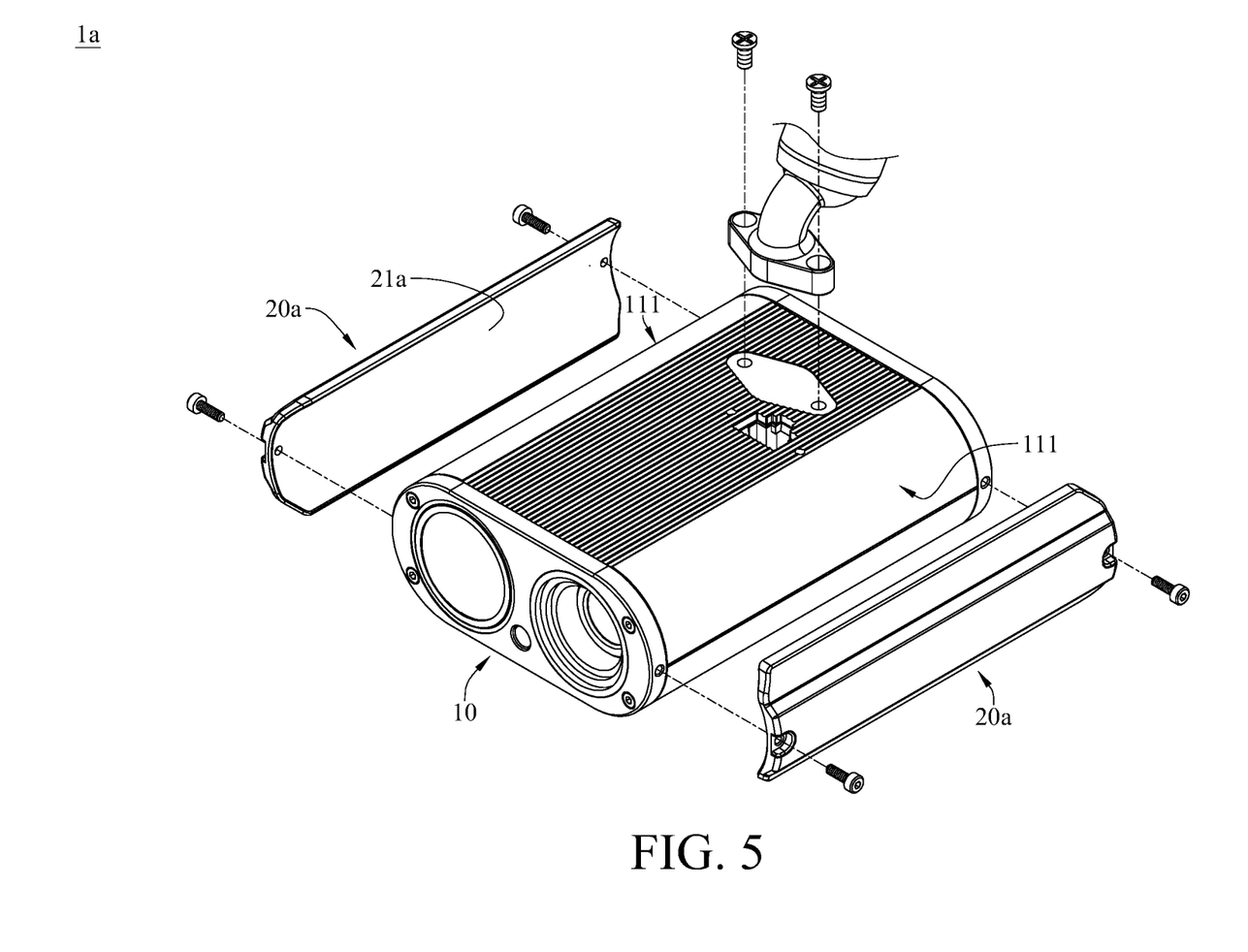
FIG. 5 is an exploded view of a vehicle camera according to another embodiment of the disclosure.
Figure 6:
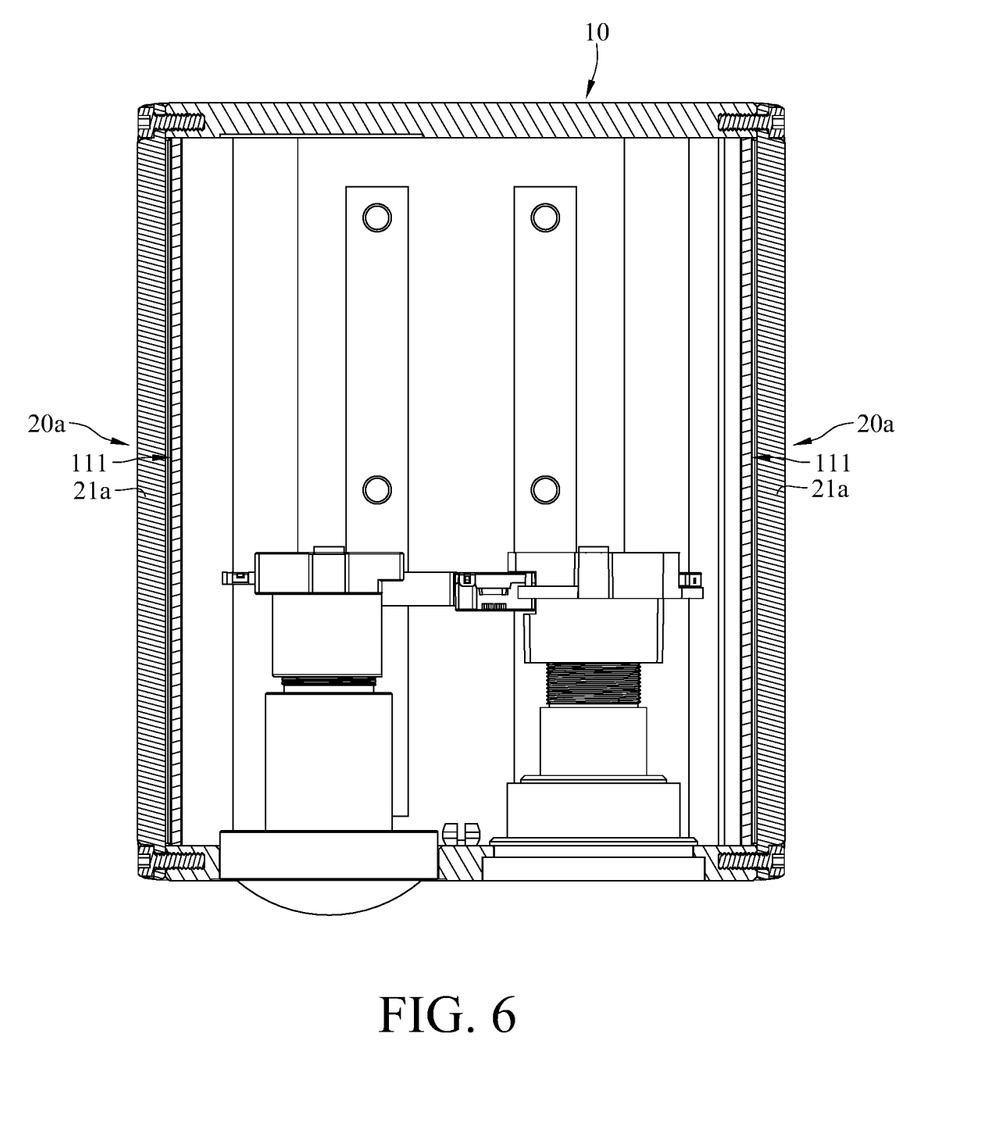
FIG. 6 is a cross-sectional view of the vehicle camera in FIG. 5.
Figure 7:
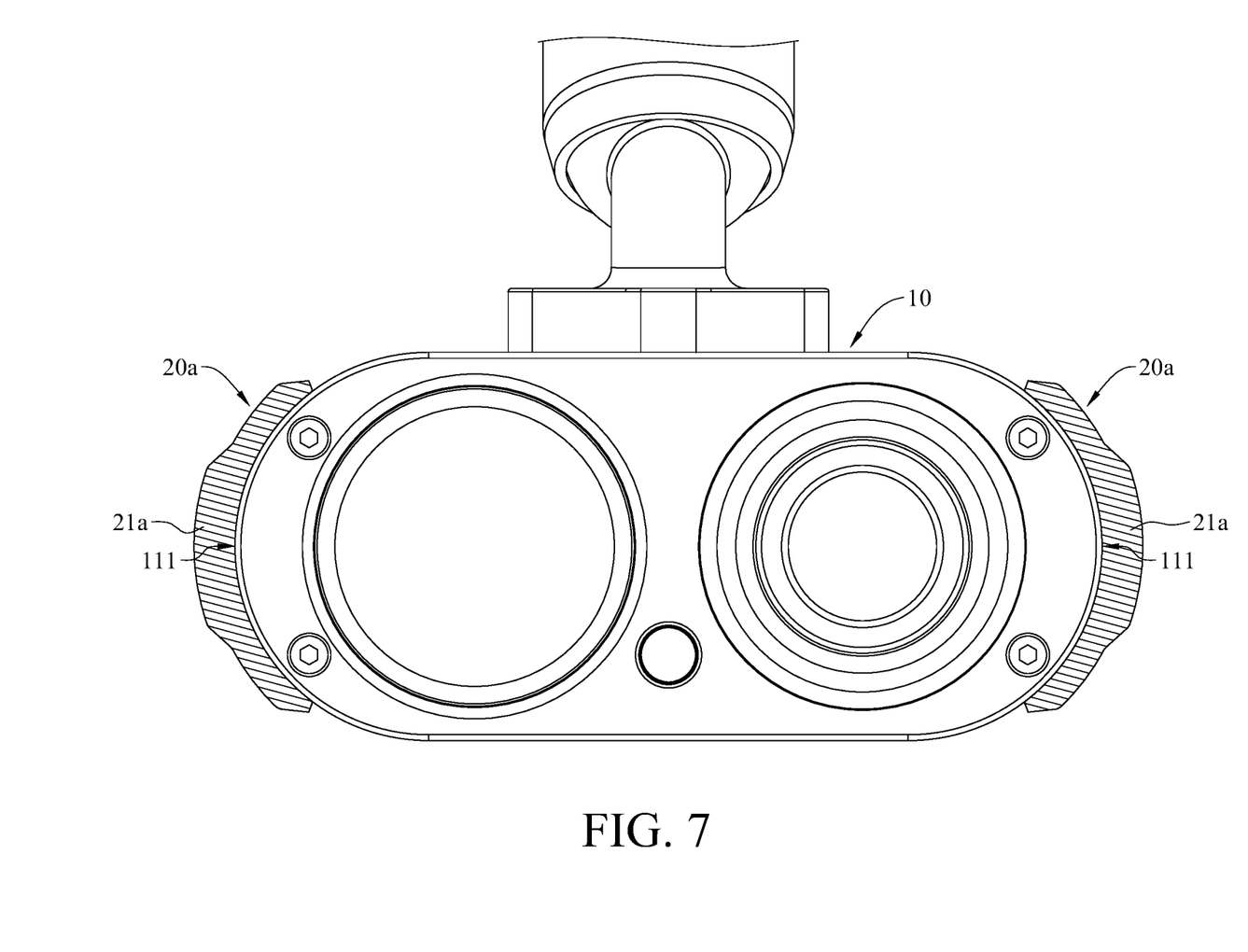
FIG. 7 is another cross-sectional view of the vehicle camera in FIG. 5.

Then, referring to FIGS. 5 to 7, FIG. 5 is an exploded view of a vehicle camera 1a according to another embodiment of the disclosure, FIG. 6 is a cross-sectional view of the vehicle camera 1a in FIG. 5, and FIG. 7 is another cross-sectional view of the vehicle camera 1a in FIG. 5.

The vehicle camera 1a of this embodiment is similar to the vehicle camera 1 of the previous embodiment, and the difference between them is mainly the structures of the thermal insulation components, and thus the following paragraphs will merely introduce the structures of the thermal insulation components of the vehicle camera 1a, and the same parts between them will not be repeatedly introduced hereinafter.

In this embodiment, in each of two thermal insulation components 20a, a middle portion 21a has no part spaced apart from the side surface 111 of the camera main body 10; that is, the middle portion 21a is entirely in contact with the side surface 111 of the camera main body 10. In this configuration, the thermal insulation components 20a also can have relative lower temperatures for the driver to be comfortably to grip thereon and rotate camera main body 10.

Note that the aforementioned side surfaces 111 of the camera main body 10 and the thermal insulation components 20 and 20a are not restricted to being in a curved shape; in some other embodiments, the aforementioned side surfaces of the camera main body and the thermal insulation components may be in a flat shape.

According to vehicle cameras as discussed in the above embodiments, the thermal insulation components are respectively disposed on the side surfaces of the camera main body facing away from each other, and the thermal conductivities of the thermal insulation components are smaller than the thermal conductivity of the camera main body, such that heat generated by the camera main body is difficult to be conducted to the thermal insulation components, and thus the thermal insulation components have relative lower temperatures. Therefore, when a driver uses one hand to grip the thermal insulation components for rotating the vehicle camera, the relative lower temperatures of the thermal insulation components may not make the driver to feel uncomfortable.

In addition, the vehicle camera is applied in the vehicle, and there is a resistance provided at the universal joint structure of the support in order to prevent the camera main body from being rotated due to vibrations caused by an uneven road condition. Also, two opposite sides of the camera main body where the thermal insulation components are disposed are the places where the hand of the driver can easily apply forces to rotate the camera main body. Therefore, when the driver desires to rotate the camera main body, the thermal insulation components disposed at the two opposite sides of the camera main body ensure the driver to comfortably rotate the camera main body for adjusting the camera angle thereof.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A vehicle camera, comprising:
    a camera main body, having two side surfaces facing away from each other, wherein the camera main body comprises a casing, a front cap, a rear cap, an electronic assembly and a lens assembly, the two side surfaces are located at the casing, the front cap and the rear cap are fixed to two opposite sides of the casing, the electronic assembly and the lens assembly are located in the casing, the front cap has an opening, and the lens assembly is exposed through the opening; and
    two thermal insulation components, respectively disposed on the two side surfaces of the camera main body facing away from each other, wherein the two thermal insulation components are fixed on the front cap and the rear cap;
    wherein thermal conductivities of the two thermal insulation components are smaller than a thermal conductivity of the camera main body.

2. The vehicle camera according to claim 1, further comprising a plurality of fasteners, wherein the two thermal insulation components are respectively fixed on the two side surfaces of the camera main body via the plurality of fasteners.

3. The vehicle camera according to claim 2, wherein each of the two thermal insulation components comprises a middle portion and two mount portions respectively connected to two opposite sides of the middle portion, the four mount portions of the two thermal insulation components are fixed on the two side surfaces of the camera main body via the plurality of fasteners, and the two middle portions of the two thermal insulation components are respectively in contact with the two side surfaces of the camera main body.

4. The vehicle camera according to claim 3, wherein the middle portion of each of the two thermal insulation components comprises two contact parts and a connection part located between and connected to the two contact parts, the four contact parts of the two middle portions of the two thermal insulation components are in contact with the two side surfaces of the camera main body, and the two connection parts of the two middle portions of the two thermal insulation components are respectively spaced apart from the two side surfaces of the camera main body by a distance.

5. The vehicle camera according to claim 1, wherein heights of the two thermal insulation components fall within a range from 90% to 110% of a height of the camera main body.

6. The vehicle camera according to claim 1, wherein the casing of the camera main body is made of metal material, and the two thermal insulation components are made of plastic material.

7. The vehicle camera according to claim 1, wherein the two thermal insulation components are plates.

8. The vehicle camera according to claim 1, further comprising a support, wherein the support is disposed on the camera main body.

9. The vehicle camera according to claim 1, wherein the thermal insulation components are fully or partially in contact with the two side surfaces of the camera main body.

10. A vehicle camera, comprising:
    a camera main body, having two side surfaces facing away from each other;
    a plurality of fasteners; and
    two thermal insulation components, respectively disposed on the two side surfaces of the camera main body facing away from each other;
    wherein thermal conductivities of the two thermal insulation components are smaller than a thermal conductivity of the camera main body,
    wherein each of the two thermal insulation components comprises a middle portion and two mount portions respectively connected to two opposite sides of the middle portion, the four mount portions of the two thermal insulation components are fixed on the two side surfaces of the camera main body via the plurality of fasteners, the middle portion of each of the two thermal insulation components comprises two contact parts and a connection part located between and connected to the two contact parts, the four contact parts of the two middle portions of the two thermal insulation components are in contact with the two side surfaces of the camera main body, and the two connection parts of the two middle portions of the two thermal insulation components are respectively spaced apart from the two side surfaces of the camera main body by a distance.

11. The vehicle camera according to claim 10, wherein heights of the two thermal insulation components fall within a range from 90% to 110% of a height of the camera main body.

12. The vehicle camera according to claim 10, wherein a casing of the camera main body is made of metal material, and the two thermal insulation components are made of plastic material.

13. The vehicle camera according to claim 10, wherein the two thermal insulation components are plates.

14. The vehicle camera according to claim 10, further comprising a support, wherein the support is disposed on the camera main body.

* * * * *